(12) United States Patent
Ikeda et al.

(10) Patent No.: US 9,933,014 B2
(45) Date of Patent: Apr. 3, 2018

(54) RACK BUSHING

(71) Applicant: JTEKT CORPORATION, Osaka-shi, Osaka (JP)

(72) Inventors: Tetsuo Ikeda, Kashiba (JP); Hidetoshi Sumihara, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/202,069

(22) Filed: Jul. 5, 2016

(65) Prior Publication Data

US 2017/0009806 A1    Jan. 12, 2017

(30) Foreign Application Priority Data

Jul. 10, 2015   (JP) .................................. 2015-139063

(51) Int. Cl.
*F16C 29/02*     (2006.01)
*B62D 3/12*      (2006.01)

(52) U.S. Cl.
CPC ................ *F16C 29/02* (2013.01); *B62D 3/12* (2013.01); *F16C 2361/61* (2013.01)

(58) Field of Classification Search
CPC ......... F16C 29/02; F16C 2361/61; B62D 3/12
See application file for complete search history.

(56) References Cited

U.S. PATENT DOCUMENTS

| 7,220,056 | B2 * | 5/2007 | Kubota | .................... | F16C 33/20 |
| | | | | | 384/215 |
| 8,696,207 | B2 * | 4/2014 | Tange | ..................... | F16C 29/02 |
| | | | | | 384/215 |
| 2012/0248724 | A1 | 10/2012 | Watanabe et al. | | |

FOREIGN PATENT DOCUMENTS

| EP | 2 202 129 A1 | 6/2010 |
| EP | 3 006 750 A1 | 4/2016 |
| JP | 2008-126715 A | 6/2008 |
| JP | 2009-286164 A | 12/2009 |
| WO | 2014/196582 A1 | 12/2014 |

OTHER PUBLICATIONS

Dec. 7, 2016 Extended European Search Report issued in European Patent Application No. 16178164.6.

* cited by examiner

*Primary Examiner* — James Pilkington
(74) *Attorney, Agent, or Firm* — Oliff PLC

(57) ABSTRACT

A cylindrical rack bushing is interposed between a tubular housing and a rack shaft inserted coaxially through the housing, and supports the rack shaft so that the rack shaft is slidable in an axial direction. The rack bushing has an inner periphery on which an inward protruding portion protruding toward an inner side of the rack bushing in a radial direction is formed. The inward protruding portion includes a top portion that is in sliding contact with the rack shaft in a line contact manner or a point contact manner.

5 Claims, 4 Drawing Sheets

RACK BUSHING

INCORPORATION BY REFERENCE

The disclosure of Japanese Patent Application No. 2015-439063 filed on Jul. 10, 2015 including the specification, drawings and abstract, is incorporated herein by reference in its entirety.

BACKGROUND OF THE INVENTION

1. Field of the Invention

The invention relates to a rack bushing.

2. Description of the Related Art

Various rack bushings have been proposed which support a rack shaft in a housing so that the rack shaft is slidable in an axial direction (see, for example, Japanese Patent Application Publication No. 2008-126715 (JP 2008-126715 A) and Japanese Patent Application Publication No. 2009-286164 (JP 2009-286164 A)). In JP 2008-126715 A, the rack shaft is in surface contact with an area of an inner periphery of a cylindrical rack bushing. The area has an axial length approximately one third of the axial length of the rack bushing and includes an axially central portion of the rack bushing. In the rack bushing in JP 2009-286164 A, a recessed portion in which grease is stored is formed in a central portion of an inner periphery of a cylindrical main body in an axial direction. A pair of rack support portions shaped like cylindrical surfaces is provided such that the rack support portions are located at both sides of the recessed portion in the axial direction. The rack support portions are in surface contact with the rack shaft.

In JP 2008-126715 A and JP 2009-286164 A, the rack bushing (main body) is in surface contact with the rack shaft over a large area, resulting in increased sliding resistance of the rack shaft.

SUMMARY OF THE INVENTION

An object of the invention is to provide a rack bushing that enables a reduction in sliding resistance of a rack shaft.

According to an aspect of the invention, a cylindrical rack bushing is interposed between a tubular housing and a rack shaft coaxially inserted through the housing, and supports the rack shaft so that the rack shaft is slidable in an axial direction. The rack bushing includes an inner periphery on which an inward protruding portion that protrudes inward in a radial direction is formed. The inward protruding portion includes a top portion that is in sliding contact with the rack shaft in a line contact manner or a point contact manner.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
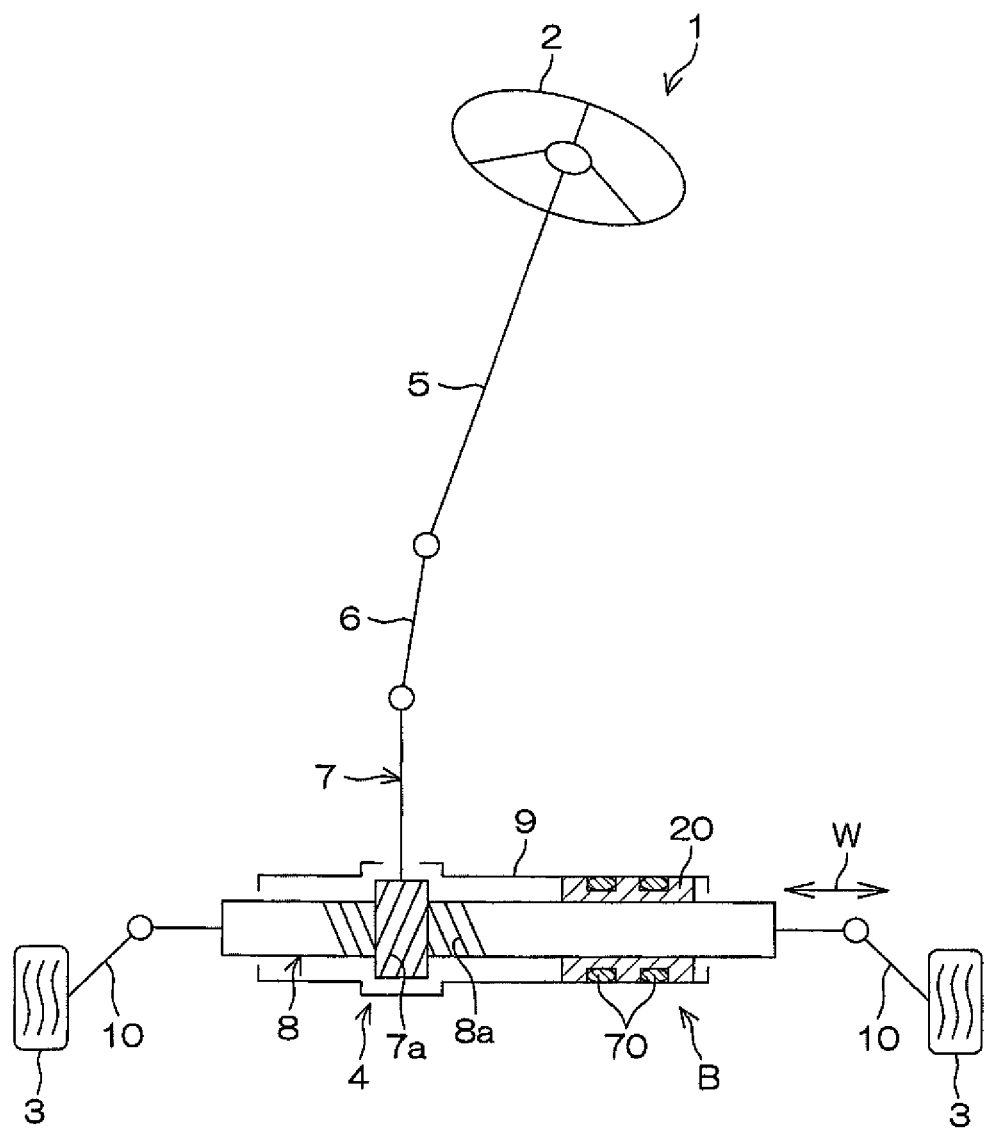
FIG. 1 is a schematic diagram of a general configuration of a steering apparatus to which a rack bushing in a first embodiment of the invention is applied.

Embodiments of the invention will be described with reference to the attached drawings. FIG. 1 is a schematic diagram depicting a general configuration of a steering apparatus 1 to which a first embodiment of the invention is applied. As seen in FIG. 1, the steering apparatus 1 includes a steering member 2 and a steering operation mechanism 4. The steering member 2 is a rotationally operated steering wheel or the like. The steering operation mechanism 4 steers steered wheels 3 in conjunction with rotation of the steering member 2. The steering apparatus 1 includes a steering shaft 5 to which the steering member 2 is attached at one end of the steering shaft 5, and an intermediate shaft 6.

The steering operation mechanism 4 includes a rack-and-pinion mechanism. The steering operation mechanism 4 includes a pinion shaft 7 and a rack shaft 8 serving as a steered shaft. The pinion shaft 7 is coupled to the steering shaft 5 via the intermediate shaft 6. The pinion shaft 7 has a pinion 7a formed near an end of the pinion shaft 7. The rack shaft 8 has a rack 8a formed on a part of an outer periphery of the rack shaft 8 in an axial direction W and meshing with the pinion 7a of the pinion shaft 7.

The steering apparatus 1 includes a tubular rack housing 9, the cylindrical rack bushing 20, and a pair of annular elastic members 70, which all serve as a rack shaft support structure B that supports the rack shaft 8. The rack bushing 20 is formed of an injection molding resin. The rack housing 9 is fixed to a vehicle body. The rack shaft 8 is coaxially inserted through the rack housing 9. The rack bushing 20 is shaped like a cylinder that surrounds the rack shaft 8 in the rack housing 9. The annular elastic members 70 are, for example, O rings that surround the rack bushing 20. The annular elastic members 70 allow the rack bushing 20 to be held on an inner periphery 9a of the rack housing 9.

Ends of the rack shaft 8 protrude outward from respective ends of the rack housing 9. The ends of the rack shaft 8 are coupled to respective steered wheels 3 via respective tie rods 10 (see FIG. 2) and respective knuckle arms (not depicted in the drawings). When the steering member 2 is rotationally operated to rotate the steering shaft 5, the rotation is converted into a linear motion of the rack shaft 8 in the axial direction W by the pinion 7a and the rack 8a. Consequently, steering of the steered wheels 3 is achieved.

Figure 2:
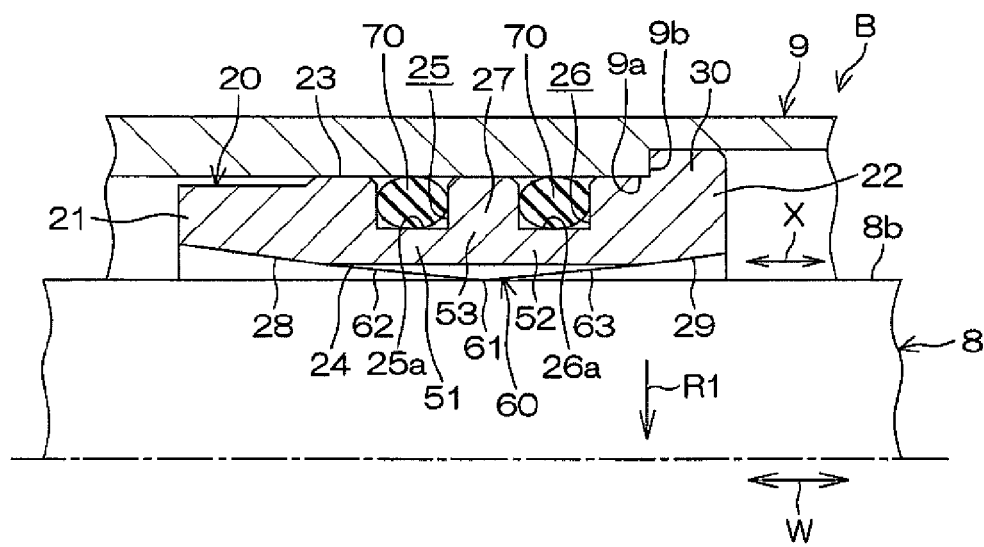
FIG. 2 is a sectional view of a rack shaft support structure including the rack bushing in the first embodiment.
Figure 3:
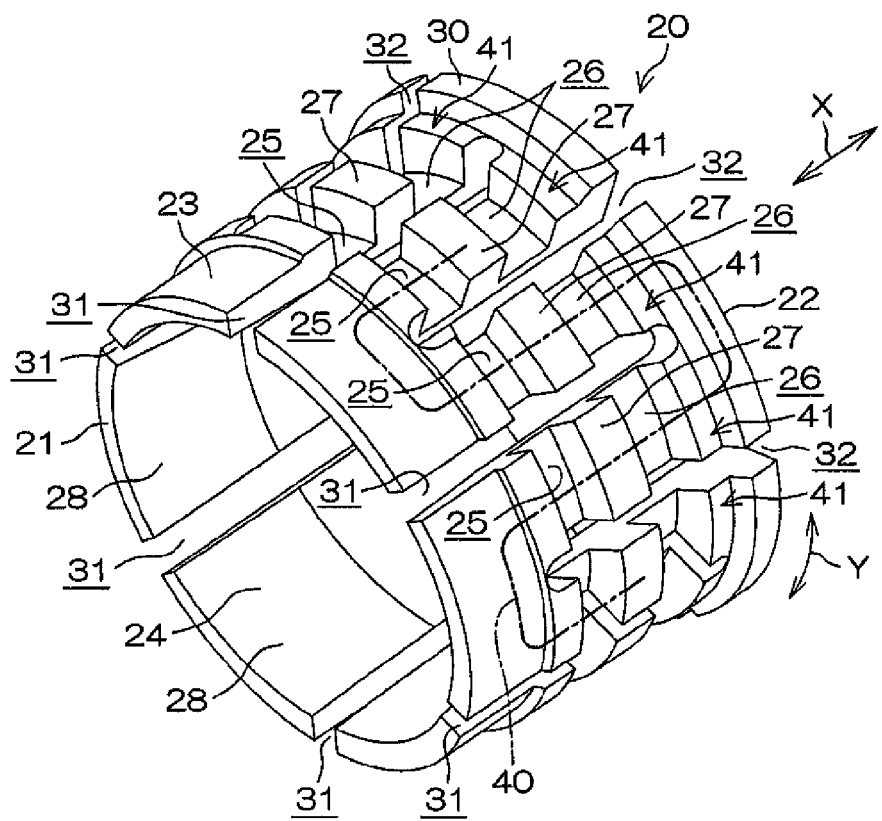
FIG. 3 is a schematic perspective view of the rack bushing in the first embodiment.
Figure 4:
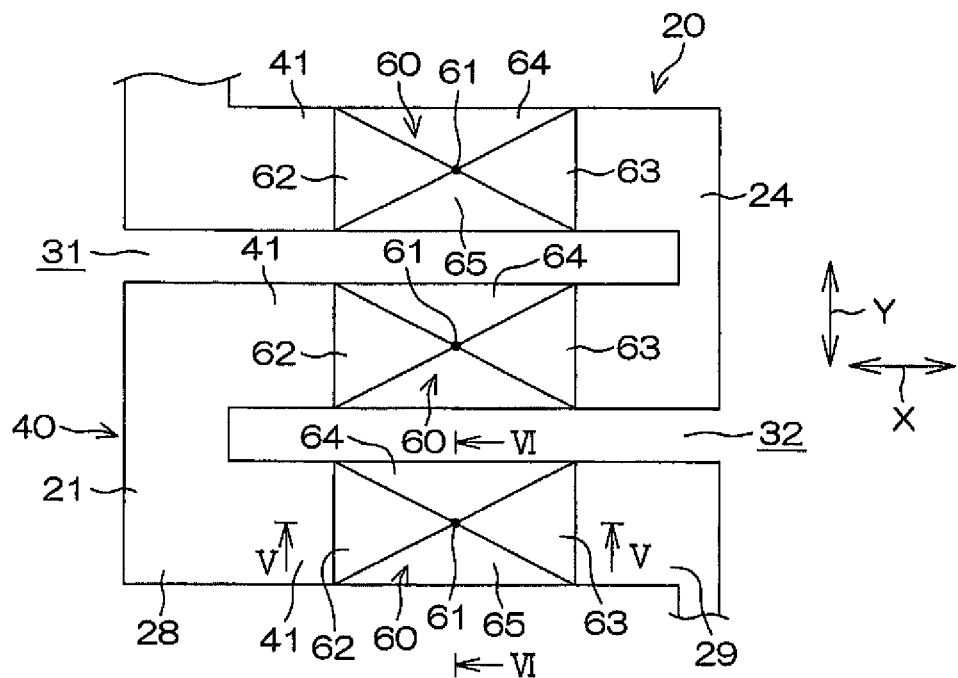
FIG. 4 is a schematic diagram of the rack bushing in the first embodiment as viewed from an inner peripheral side of the rack bushing.

FIG. 2 is a sectional view of the rack shaft support structure B, and FIG. 3 is a perspective view of the rack bushing 20. FIG. 4 is a schematic diagram of the rack bushing 20 as viewed from an inner side of the rack bushing 20 in a radial direction. As depicted in FIG. 2 and FIG. 3, the rack bushing 20 includes a first axial end 21, a second axial end 22, an outer periphery 23, and an inner periphery 24. The first axial end 21 and the second axial end 22 are disposed on the opposite sides of the rack bushing 20 in an axial direction X.

As depicted in FIG. 2, a portion of the inner periphery 24 at the first axial end 21 is a tapered portion 28 inclined such that a bore diameter of the rack bushing 20 increases toward an outer side of the rack bushing 20 in the axial direction X. A portion of the inner periphery 24 at the second axial end 22 is a tapered portion 29 inclined such that the bore diameter of the rack bushing 20 increases toward an outer side of the rack bushing 20 in the axial direction X. The tapered portion 28 and the tapered portion 29 are inclined toward the opposite sides of the rack bushing 20 in the axial direction X.

A portion of the outer periphery 23 at the second axial end 22 is a flange 30 protruding outward in the radial direction. The flange 30 is in contact with a positioning step portion 9b on the inner periphery 9a of the rack housing 9, so that the rack bushing 20 is positioned in the axial direction X with respect to the rack housing 9. On the outer periphery 23, a pair of outer recessed portions 25, 26 is formed. The outer recessed portions 25, 26 are separated from each other in the axial direction X and extend in a circumferential direction Y. Between the outer recessed portions 25, 26, a partitioning portion 27 is interposed which partitions the outer recessed portions 25, 26 from each other.

As depicted in FIG. 2, the annular elastic members 70 are housed and elastically compressed in the outer recessed portions 25, 26, and elastically fitted on the inner periphery 9a of the rack housing 9. As depicted in FIGS. 2 to 4, the rack bushing 20 has first axial slits 31 and second axial slits 32. Each of the first axial slits 31 and each of the second axial slits 32 extend from the opposite sides of the rack bushing 20 in the axial direction X, and the first axial slits 31 and the second axial slits 32 are separated from one another in the circumferential direction Y. The axial slits 31, 32 formed in the rack bushing 20 enable the rack bushing 20 to be elastically reduced in diameter.

Each of the first axial slits 31 extends from the first axial end 21 to a middle portion of the rack bushing 20 in the axial direction X. Each of the second axial slits 32 extends from the second axial end 22 to a middle portion of the rack bushing 20 in the axial direction X. The first axial slits 31 and the second axial slits 32 are provided at regular intervals and alternately in a staggered manner in the circumferential direction Y. Formation of the first axial slits 31 and the second axial slits 32 results in formation, in the rack bushing 20, of a meandering portion 40 (depicted by a long dashed short dashed line in order to facilitate understanding) that is continuous in the circumferential direction Y while meandering in the axial direction X. The meandering portion 40 includes a plurality of axial portions 41 extending in the axial direction X such that the axial portions 41 and the axial slits 31, 32 are alternately disposed in the circumferential direction Y. The meandering portion 40 extends all along the circumference of the rack bushing 20 so as to be continuous in the circumferential direction Y while meandering in the axial direction X.

As depicted in FIG. 2, the rack bushing 20 includes a pair of thin-walled portions 51, 52 and a thick-walled portion 53 that is thicker than the thin-walled portions 51, 52. The thin-walled portions 51, 52 are formed between the inner periphery 24 and respective bottoms 25a, 26a of the outer recessed portions 25, 26. The thick-walled portion 53 includes the partitioning portion 27 and is interposed between the thin-walled portions 51, 52. On the inner periphery 24, an inward protruding portion 60 is formed which protrudes toward an inner side R1 of the rack bushing 20 in the radial direction. The inward protruding portion 60 includes a top portion 61, a pair of axial slope portions 62, 63 (see FIG. 5 that is a section taken along the line V-V in FIG. 4) and a pair of circumferential slope portions 64, 65 (see FIG. 6 that is a section taken along the line VI-VI in FIG. 4).

Figure 5:
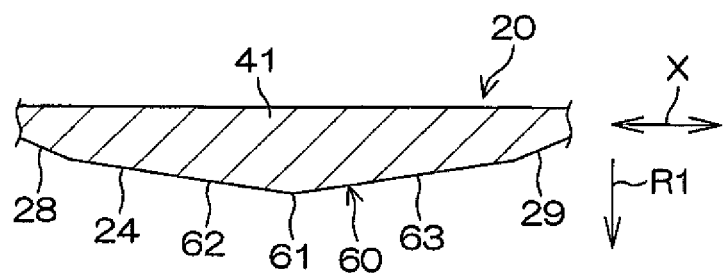
FIG. 5 is a sectional view taken along the line V-V in FIG. 4.
Figure 6:
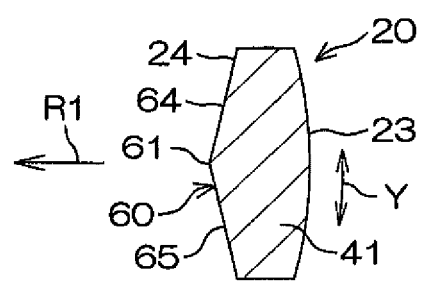
FIG. 6 is a sectional view taken along the line VI-VI in FIG. 4.

The top portion 61 is in sliding contact with the rack shaft 8 in a line contact manner or a point contact manner. The top portion 61 is disposed on an inner side R1 of the thick-walled portion 53 in the radial direction. The line contact manner refers to a state where the top portion is substantially in line contact with the rack shaft 8. The point contact manner refers to a state where the top portion is substantially in point contact with the rack shaft 8. As depicted in FIG. 5, the axial slope portions 62, 63 are disposed on both sides of the top portion 61 in the axial direction X and inclined from the top portion 61 to the opposite sides of the inward protruding portion 60 in the axial direction X. As depicted in FIG. 6, the circumferential slope portions 64, 65 are disposed on both sides of the top portion 61 in the circumferential direction Y and inclined from the top portion 61 to the opposite sides of the inward protruding portion 60 in the circumferential direction Y.

The outer recessed portions 25, 26, the partitioning portion 27, the inward protruding portion 60, the thin-walled portions 51, 52, and the thick-walled portion 53 are disposed on each of the axial portions 41 of the meandering portion 40. In the present embodiment, on the inner periphery 24 of the rack bushing 20, the top portion 61 of the inward protruding portion 60 protruding toward the inner side R1 of the rack bushing 20 in the radial direction is in sliding contact with the rack shaft 8 in a line contact manner or a point contact manner. This reduces the area over which the rack bushing 20 is in sliding contact with the rack shaft 8, and thus reduces sliding resistance of the rack shaft 8.

In the thick-walled portion 53 interposed between the thin-walled portions 51, 52, material shrinkage is likely to occur after injection molding. In contrast, in the inward protruding portion 60, the top portion 61, which protrudes by the longest distance toward the inner side R1 of the rack bushing 20 in the radial direction, is disposed on the inner side R1 of the thick-walled portion 53 in the radial direction. Thus, in spite of the adverse effect of the material shrinkage, the protruding shape of the top portion 61, which is in line contact or the like with the rack shaft 8, can be secured.

Figure 7:
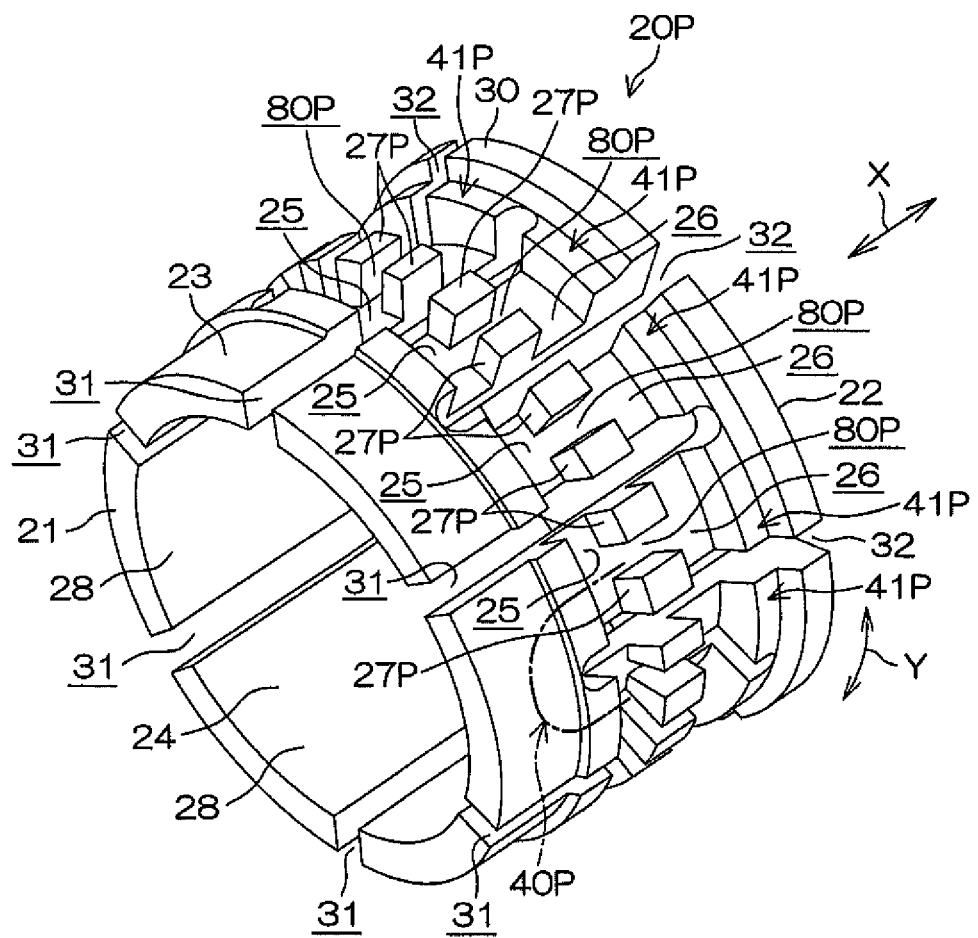
FIG. 7 is a schematic perspective view of a rack bushing in a second embodiment of the invention.
Figure 8:
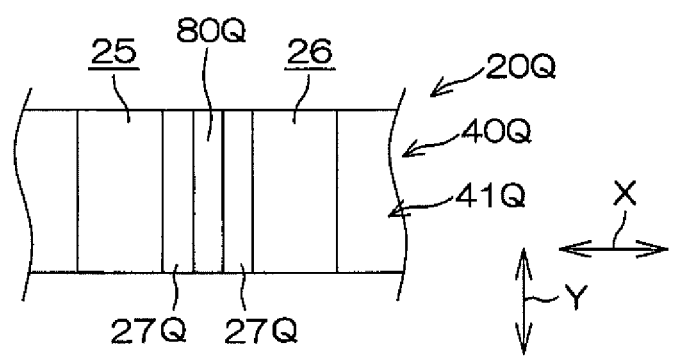
FIG. 8 is a schematic plan view of an axial portion of a meandering portion of a rack bushing in a third embodiment of the invention.

The inward protruding portions 60 are not disposed all along the circumference of the inner periphery 24. The inward protruding portions 60 are disposed on the respective axial portions 41 of the meandering portion 40, which are separated from one another in the circumferential direction Y by the axial slits 31, 32. This reduces the area over which the rack bushing 20 is in sliding contact with the rack shaft 8, and thus further reduces the sliding resistance of the rack shaft 8. The protruding distance of the inward protruding portion 60 (the height of the top portion 61) is preferably large in order to secure the line contact or the like in spite of the material shrinkage. On the other hand, when the rack bushing 20 is shaped by injection molding, the inward protruding portion 60 is forcibly extracted from a mold after injection molding. Thus, the protruding distance of the inward protruding portion 60 is preferably small. This is because a large amount of forcibly extracted material may vary the dimensions of the molded rack bushing. In view of these two points (securing the line contact or the like and a reduction in the amount of forcibly extracted material), the protruding distance of the inward protruding portion 60 (the height of the top portion 61) is preferably set within the range of 50 μm to 300 μm, more preferably within the range of 100 μm to 200 μm, and much more preferably within the range of 100 µm to 150 µm. FIG. 7 is a schematic perspective view of a rack bushing 20P in a second embodiment of the invention. FIG. 8 is a schematic perspective view of a rack bushing 20Q in a third embodiment of the invention.

The rack bushing 20P in the second embodiment is different from the rack bushing 20 in the first embodiment in FIG. 3 in that, on each axial portion 41P of a meandering portion 40P, a cutout portion 80P that is a recessed portion is formed in a central portion of a partitioning portion 27P in the circumferential direction Y. The bottom of the cutout portion 80P need not be flush with the bottoms of the outer recessed portions 25, 26. The rack bushing 20Q in the third embodiment if FIG. 8 is different from the rack bushing 20 in the first embodiment in FIG. 3 in that, on each axial portion 41Q of a meandering portion 40Q, a cutout portion 80Q that is a recessed portion is formed in a central portion of a partitioning portion 27Q in the axial direction X. The bottom of the cutout portion 80Q need not be flush with the bottoms of the outer recessed portions 25, 26.

In the second embodiment and the third embodiment, the cutout portion 80P, 80Q formed in the partitioning portion 27P, 27Q reduces the amount of material in the thick-walled portion 53 (not depicted in FIG. 7 or FIG. 8) so that the amount is close to the amount of material in the thin-walled portions 51, 52. Thus, the amount itself of material shrinkage resulting from injection molding can be reduced. Since the amount of material shrinkage is reduced, it is possible to set the protruding distance of the inward protruding portion 60 to a smaller value. This allows reducing the amount of material forcibly extracted from a mold during mold release, and thus the rack bushing 20P, 20Q with high dimensional accuracy can be implemented.

In the second embodiment and the third embodiment, although not depicted in the drawings, the top portion 61 of the inward protruding portion 60 provided on the inner periphery 24 may be disposed at a position at an inner side R1 of the partitioning portion 27P, 27Q in the radial direction such that the position is located away from the cutout portion 80P, 80Q in the circumferential direction, or at a position at an inner side R1 of the cutout portion 80P, 80Q in the radial direction. The invention is not limited to the above-described embodiment. For example, the top portion 61 of the inward protruding portion 60 may extend linearly by a predetermined length in the axial direction X or extend linearly by a predetermined length in the circumferential direction Y. A plurality of inward protruding portion 60 separated from one another in the circumferential direction may be disposed on each of the axial portions 41.

The inward protruding portion may be formed by cutting. Various other changes may be made to the invention within the scope of the claims.

What is claimed is:

1. A cylindrical rack bushing that is configured to be interposed between a tubular housing and a rack shaft coaxially inserted through the housing, and that is configured to support the rack shaft so that the rack shaft is slidable in an axial direction, the rack bushing comprising:
   an inner periphery on which an inward protruding portion that protrudes inward in a radial direction is formed,
   wherein the inward protruding portion includes a top portion, a pair of axial slope portions, and a pair of circumferential slope portions such that the pair of axial slope portions are transverse to the pair of circumferential slope portions, the top portion is in sliding contact with the rack shaft in a line contact manner or a point contact manner, and the top portion is located at a peak of the pair of axial slope portions and the pair of circumferential slope portions.

2. The rack bushing according to claim 1, further comprising:
   an outer periphery in which a pair of outer recessed portions, separated from each other in the axial direction, is formed;
   a pair of first portions formed between the inner periphery and each of the outer recessed portions; and
   a second portion that includes a partitioning portion that partitions the outer recessed portions from each other and that is interposed between the pair of first portions,
   wherein:
      the second portion is thicker than each of the first portions in the pair of first portions,
      the rack bushing is formed of an injection molding resin, and
      the top portion is disposed on an inner side of the second portion in the radial direction.

3. The rack bushing according to claim 2, further comprising:
   a plurality of axial slits, the axial slits extending in the axial direction alternately from a pair of axial ends of the rack bushing to a middle portion of the rack bushing in the axial direction such that the axial slits are separated from one another at regular intervals in a circumferential direction in a staggered manner, and
   a meandering portion that includes a plurality of axial portions extending in the axial direction such that the axial portions and the axial slits are alternately disposed in the circumferential direction, the meandering portion being continuous in the circumferential direction while meandering in the axial direction,
   wherein:
      the rack bushing is enabled to be elastically reduced in diameter, and
      the outer recessed portions, the partitioning portion, the inward protruding portion, the pair of first portions, and the second portion are each disposed on the axial portions of the meandering portion.

4. The rack bushing according to claim 3, wherein a cutout portion is formed in the partitioning portion.

5. The rack bushing according to claim 2, wherein a cutout portion is formed in the partitioning portion.

* * * * *